US010102282B2

(12) United States Patent
Lee et al.

(10) Patent No.: US 10,102,282 B2
(45) Date of Patent: Oct. 16, 2018

(54) APPARATUS FOR MEDIATION BRIDGE ONTOLOGY BASED ON ONTOLOGY ALIGNMENT PATTERN

(71) Applicant: UNIVERSITY-INDUSTRY COOPERATION FOUNDATION OF KYUNG HEE UNIVERSITY, Yongin-si (KR)

(72) Inventors: Sung Young Lee, Seongnam-si (KR); Wajahat Ali Khan, Yongin-si (KR)

(73) Assignee: UNIVERSITY-INDUSTRY COOPERATION FOUNDATION OF KYUNG HEE UNIVERSITY, Yongin-si (KR)

( * ) Notice: Subject to any disclaimer, the term of this patent is extended or adjusted under 35 U.S.C. 154(b) by 270 days.

(21) Appl. No.: 14/944,308

(22) Filed: Nov. 18, 2015

(65) Prior Publication Data

US 2017/0140045 A1    May 18, 2017

(51) Int. Cl.
*G06F 17/30* (2006.01)
(52) U.S. Cl.
CPC .............................. *G06F 17/30734* (2013.01)
(58) Field of Classification Search
CPC .................................................. G06F 17/30734
(Continued)

(56) References Cited

U.S. PATENT DOCUMENTS 5,872,973 A * 2/1999 Mitchell et al. .......... G06F 9/46
719/332

7,334,223 B2 * 2/2008 Kumar et al. ............ G06F 9/45
717/137
(Continued)

FOREIGN PATENT DOCUMENTS

| KR | 10-2009-0031017 A | 3/2009 |
| KR | 10-2009-0118901 A | 11/2009 |
| KR | 10-2012-0082620 A | 7/2012 |

OTHER PUBLICATIONS

Hu, Wei, and Yuzhong Qu. "Falcon-AO: A practical ontology matching system." Web Semantics: Science, Services and Agents on the World Wide Web 6.3 (2008): 237-239, Nanjing, China.
(Continued)

*Primary Examiner* — Mark E Hershley
(74) *Attorney, Agent, or Firm* — NSIP Law

(57) ABSTRACT

An apparatus for processing Mediation Bridge Ontology (MBO) based on ontology alignment patterns. The apparatus includes an MBO strategy design pattern component to have a plurality of strategy design pattern classes, to request, from a Pattern Relationship Model (PRM) component, a PRM for execution of the plurality of strategy design pattern classes, to receive the requested PRM from the PRM component, to execute a strategy design pattern using the received PRM, to acquire alignment information from the executed strategy design pattern, and to store the acquired alignment information, an MBO mediation pattern component to add a new class to the MBO strategy design pattern component through an interface used for communicating with other objects, and the PRM component to have a plurality of PRMs, and, in response to a request from the MBO strategy design pattern component, to provide a PRM to the MBO strategy design pattern component.

3 Claims, 2 Drawing Sheets

(58) Field of Classification Search
USPC .......................................................... 707/794
See application file for complete search history.

(56) References Cited

U.S. PATENT DOCUMENTS

| | | | | |
|---|---|---|---|---|
| 7,926,029 | B1* | 4/2011 | Stoyen | G06F 8/20 706/11 |
| 2002/0194201 | A1* | 12/2002 | Wilbanks | G06F 17/30253 |
| 2003/0172368 | A1* | 9/2003 | Alumbaugh | G06F 8/71 717/106 |
| 2008/0288437 | A1* | 11/2008 | Siregar | G06N 5/02 706/50 |
| 2009/0254877 | A1* | 10/2009 | Kuriakose | G06F 8/36 717/105 |
| 2012/0330869 | A1* | 12/2012 | Durham | G06N 3/02 706/16 |
| 2013/0304431 | A1* | 11/2013 | Kannegala | G06Q 10/00 703/2 |
| 2014/0279837 | A1* | 9/2014 | Guo | G06F 17/30589 707/603 |
| 2014/0282586 | A1* | 9/2014 | Shear | G06F 9/5072 718/104 |
| 2015/0160988 | A1* | 6/2015 | Scomparim | G06F 7/00 719/318 |

OTHER PUBLICATIONS

Khan, Wajahat Ali, et al. "An adaptive semantic based mediation system for data.interoperability among health information systems." *Journal of medical systems* 38.8 (2014): 1-18, New York, NY, USA.

Amin, Muhammad Bilal, et al. "SPHeRe." The Journal of Supercomputing 68.1 (2014): 274-301, New York, NY, USA.

* cited by examiner

APPARATUS FOR MEDIATION BRIDGE ONTOLOGY BASED ON ONTOLOGY ALIGNMENT PATTERN

BACKGROUND

1. Field

The following description relates to an ontology mapping technology, and more particularly to a technology relating to ontology alignment patterns in the domain of ontology mapping.

2. Description of the Related Art

With development of the Internet, massive information are available in public, which has led the society and technologies to develop one step further. However, it is difficult and takes long time to search for a desired document in the sea of information. To solve this problem, there has been developed semantic technologies which aim to achieve interoperability based on defined semantics in order to more efficiently utilize massive information resources. As one of the semantic technologies, ontology has been introduced, which specifies a common conceptualization and provides semantic information of a domain.

Hu, W., & Qu, Y. Falcon-AO: A practical ontology matching system. Web Semantics: Science, Services and Agents on the World Wide Web, 2008; 6(3), 237-239 deals with Falcon that is an ontology matching system. In this related art, the ontology matching system utilizes a partitioning technique to provide a finding, aligning, or learning ontology so that ontology alignment is provided by matching ontologies.

In addition, Korean Patent Publication No. 10-2012-0082620 proposes a method for aligning ontology and an ontology alignment system thereof. This related art may reduce loss of information by aligning ontologies and directly comparing graph structures of an entity included in the ontologies. However, it does not deals how to make extendibility and reusability of an ontology easier. As such, most of the existing ontology matching systems focus on automation and accuracy of results, but fail to cope with alignment and extendibility of ontologies.

SUMMARY

The following description relates to an apparatus for processing a Mediation Bridge Ontology (MBO) ontology, the apparatus which may evolve by adding a new bridge algorithm.

In one general aspect, there is provided an apparatus for processing Mediation Bridge Ontology (MBO) based on ontology alignment patterns, the apparatus including: an MBO strategy design pattern component configured to have a plurality of strategy design pattern classes, to request, from a Pattern Relationship Model (PRM) component, a PRM for execution of the plurality of strategy design pattern classes, to receive the requested PRM from the PRM component, to execute a strategy design pattern using the received PRM, to acquire alignment information from the executed strategy design pattern, and to store the acquired alignment information; an MBO mediation pattern component configured to add a new class to the MBO strategy design pattern component through an interface used for communicating with other objects; and the PRM component configured to have a plurality of PRMs, and, in response to a request from the MBO strategy design pattern component, to provide a PRM to the MBO strategy design pattern component.

The MBO mediation pattern component may be configured to transfer messages among the plurality of strategy design pattern classes of the MBO strategy design pattern component. The PRM component may be further configured to add a new PRM so as to apply a new bridge algorithm. The MBO strategy design pattern component may be further configured to comprise one or more strategy design patterns in the following: ChildPattern, PropertyPattern, StringPattern, SynonymPattern, Pattern, OverlapPattern, and LabelPattern.

Other features and aspects may be apparent from the following detailed description, the drawings, and the claims.

Figure 1:
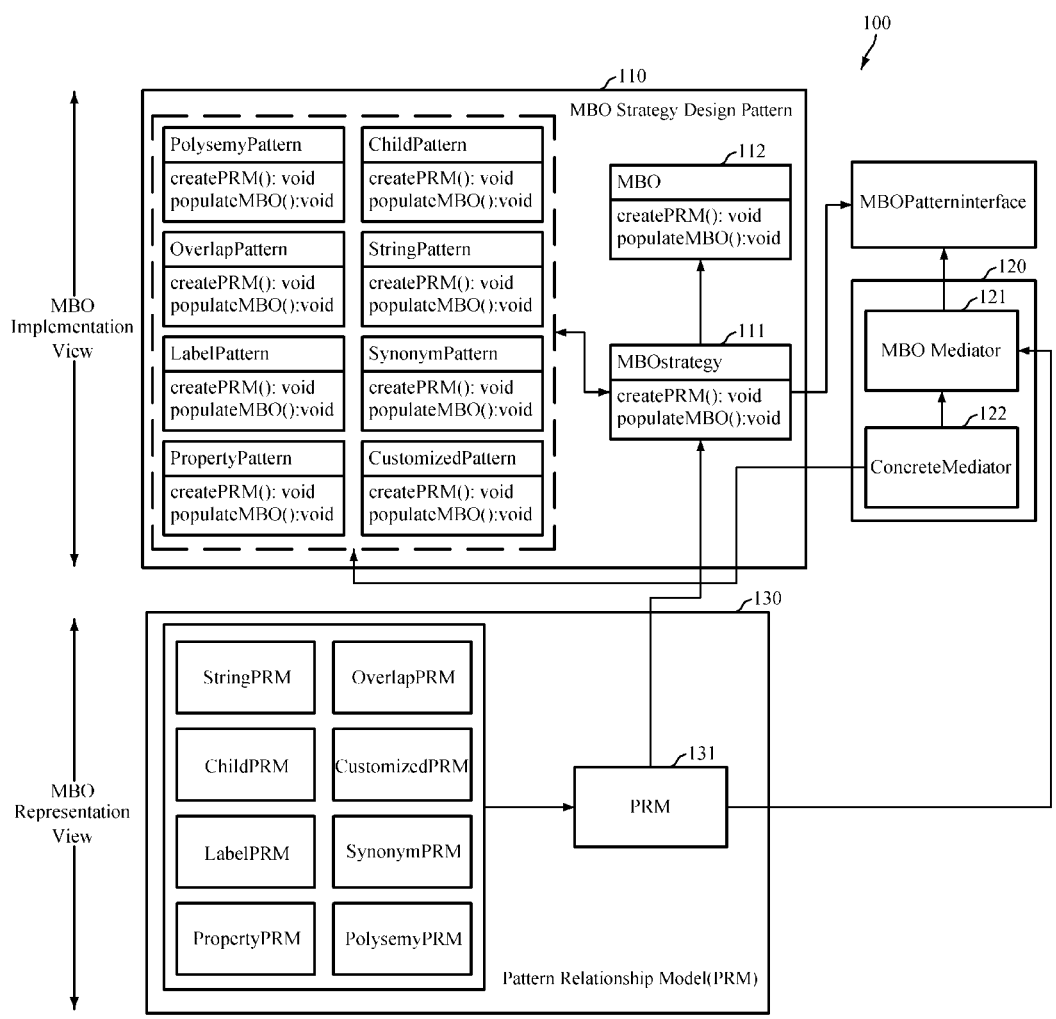
FIG. 1 is a diagram illustrating an apparatus for processing Mediation Bridge Ontology (MBO) based on an ontology alignment pattern according to an exemplary embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Semantic web is dependent on extensive knowledge management by inter linking resources on the web using matching techniques. This role is played by the progressing domain of ontology matching, by introducing ontology matching tools. The focus of these matching tools is limited to matching techniques and automation only, rather than expressive formal representation of alignments. The present disclosure proposes Mediation Bridge Ontology (MBO), an expressive alignment representation ontology used to store correspondences between matching ontologies matched by our ontology matching tool, System for Parallel Heterogeneity Resolution (SPHeRe). The MBO utilizes object oriented design patterns and the ontology alignment design patterns to provide extendibility and reusability factors to the SPHeRe. An apparatus for processing MBO based on an ontology alignment patterns according to an exemplary embodiment of the present invention has better Coupling Factor (COF), Number of Polymorphic methods (NOP), and Rate of Change (RoC) metrics to support extendibility and reusability as compare to existing systems. These factors contributes in the overall objective of interoperability for knowledge management in the semantic web.

FIG. 1 is a diagram illustrating an apparatus for processing MBO based on an ontology alignment pattern according to an exemplary embodiment of the present disclosure.

Referring to FIG. 1, an apparatus 100 for processing MBO based on an ontology alignment pattern includes a Mediation Bridge Ontology (MBO) strategy design pattern component 110, an MBO mediator pattern component 120, and a pattern relationship model component 130.

The MBO strategy design pattern component 110 and the MBO mediator design pattern component 120 explain the implementation view of the system design, while the pattern relationship model component 130 describes MBO patterns as representation of the alignments. The apparatus 100 according to the present disclosure has adapted the concept of Strategy and Mediator design patterns from the object oriented design community. In addition, the apparatus 100 uses a PRM based on the concept of strategy design patterns and mediator design patterns so as to enable the system to be extendible, flexible, and agile.

MBO is categorized into two main classes Mediation-Bridge and PatternClass. MediationBridge is divided into syntactic and structural bridge subclasses including String Matching Bridge, Label Bridge, Synonym Bridge, Polysemous Bridge, Overlap Bridge, Customized Bridge, Children Based Structural Bridge (CBSB), and Property Based Structural Bridge (PBSB). These bridge classes represent the alignments generated from particular algorithms in their specified format. These are dependent on PatternClass for structuring the output of the alignment process. PatternClass include subclasses including MappedSequence, Standard1Class, Standard2Class, Match, MappedClass, ListStandard1, and ListStandard2. The bridge classes provide the structure for representation of the alignment in the MBO.

These concepts are related to each other by using object properties. MediationBridge class is related through usesPattern object property with Pattern Class. Every subclass of MediationBridge uses some pattern classes from the PatternClass subclasses to define its alignment representation. OverlapBridge class is related through hasSourceClass and hasTargetClass object properties with Standard1Class and Standard2Class respectively. Standard1Class uses hasSameRelationship and consistsMandatoryAttributes object properties to connect with Standard2Class and MandatoryAttribute respectively. Based on the previous triples, OverlapBridge is related with the Match class using hasRestriction object property. This makes the complete alignment representation for OverlapPRM described in the later section. In the same way, other MediationBridge classes defines their pattern to represent alignment in the MBO.

The MBO utilizes Strategy Design Pattern and Mediator Pattern to incorporate object oriented design approach for agility and reusability of the apparatus 100.

The MBO strategy design pattern component 110 is based on classes that differ only in their behaviors. Therefore, MBO strategy design pattern 110 needs to be isolated to provide the ability to select different algorithms at runtime. Defining a family of algorithms of the MBO strategy design pattern component 110 enables encapsulate each algorithm and make the algorithms interchangeable. The MBO strategy component 111 of the MBO strategy design pattern component 110 lets an algorithm independently from a client that use the algorithm. In addition, the MBO component 112 of the MBO strategy design pattern component 110 may be applied as an interface that defines the behavior of an MBO.

The strategy design patterns of the MBO strategy design pattern component 110 may include ChildPattern, PropertyPattern, StringPattern, SynonymPattern, PolysemyPattern, OverlapPattern, LabelPattern, and the like. Each of these pattern classes of the MBO strategy design pattern component 110 calls a specific PRM from the PRM model component 130 for execution. Once the specific PRM is received from the PRM model component 130, the MBO strategy design pattern component 110 executes a strategy design pattern corresponding to the received specific PRM, acquire alignment information of the executed strategy design pattern by using contact class, and store the alignment information in a specific format.

The MBO mediator design pattern component 120 provides one or more classes that can use the services of other classes. Therefore, the MBO mediator design pattern component 120 is necessary between classes for reusability purpose. The MBO mediator design pattern component 120 defines an interface for communicating with related objects for understanding interdependencies among the classes. The MBO mediator component 121 of the MBO mediation design pattern component 120 provides an interface required for communication with an oriented object for understanding interdependencies among classes. That is, the MBO mediation design pattern component 120 provides an interface that connects a new class to the MBO strategy design pattern component 110, so that the new class is applied to MBO strategy design pattern 110. An interface class of the MBO Mediator Design Pattern component 120 may be applied in communicating with other objects in well-defined and complex ways.

The ConcreteMediator Class 122 of the MBO mediation design pattern component 120 keeps reference of all the colleague objects. In addition, the MBO mediation design pattern component 120 is used to transfer messages between strategy design pattern classes of the MBO strategy design pattern component 110.

The PRM component 130 provides a PRM used by one or more strategy design patterns included in the MBO strategy design pattern component 110. For example, StringPattern class of the MBO strategy design pattern component 110 calls String PRM class of the PRM component 130 for execution. All the PRM classes may be derived from the PRM component 131 abstract class. Evolution in matching techniques or introduction of new bridge algorithms is made convenient by the PRM component 130. Therefore, the evolution of the PRM component 130 may possess significance of adaption by the ontology matching community.

That is, the MBO strategy design pattern component 110 of the apparatus 100 performs ontology alignment by executing a strategy pattern design pattern class using a PRM of the PRM component 130. Thus, the system may be able to evolve with a new ontology algorithm which is added in a manner where a PRM is added to the PRM component 130.

Extendibility is one of the evaluation metric of the apparatus 100. A strategy design pattern of the MBO strategy design pattern component 110 is used for extendibility which allows a new PRM to be added to the PRM component. A new bridge algorithm can easily be accommodated in the apparatus 100 designed with low coupling, high polymorphism and less rate of change. This may be achieved by using the MBO strategy design pattern component 110 and the PRM component 130. The apparatus 100 may accommodate a new bridge algorithm that implements an interface. In addition, a scenario in which the new bridge is based on matching-based instance, called Instance Matching Bridge, is considered.

Instance PRM is connected to the PRM in the MBO representation view that deals with actual representation of the alignment. A class InstancePattern may implement an interface class of the MBO strategy design pattern component 110, and the class InstancePattern of the MBO strategy design pattern component 110 provides reference information to the MBO mediation design pattern component 120. Therefore, tuple metrics information for extendibility is as follows:

TABLE 1

Tuple metrics information for extendibility

| Tuple Metrics | Definition |
|---|---|
| $I_F$ | An algorithm to match source and target concepts based on instances comparison |
| $I_N$ | InstancePRM and InstancePattern classes to be added in the class diagram to support extendibility |
| Q | Polymorphism, increased |
| S | Source Concept that belongs to the matching source ontology |
| T | Target Concept that belongs to the matching target ontology |
| A | Instances of source and target concepts |
| EC | A specific number of instances matching than source and target concepts are similar |
| MV | A value between 0 and 1 that is based on instances matched |

The apparatus 100 may add a new bridge algorithm using the MBO mediation design pattern component 120 and the PRM component 130. For example, a new bridge called Hyponym Bridge uses CBSB and PBSB together to find matching concepts. A Hyponym PRM is connected to a PRM in the PRM component 130. In addition, HyponymPattern class implements MBO strategy interface class and provides reference to ConcreteMediator class of the MBO strategy design pattern component 120.

TABLE 2

Tuple metrics information for reusability

| Tuple Metrics | Definition |
|---|---|
| $I_F$ | An algorithm to match source and target concepts based on existing CBSB and PBSB algorithms |
| $I_N$ | HyponymPRM and HyponymPattern classes to be added in the class diagram for reusability |
| Q | Coupling, decreased |
| S | Source Concept that belongs to the matching source ontology |
| T | Target Concept that belongs to the matching target ontology |
| A | Children and properties match of the matching concepts |
| EC | A specific number of children and properties match for source and target concepts match |
| MV | A value between 0 and 1 that is based on CBSB and PBSB results match |

The metrics in Table 2 enable easy integration of new bridge algorithm, thereby prolonging the lifetime of the apparatus 100. State of the art matching techniques and new methodologies may be plug and play to the apparatus 100, without disturbing the design of the apparatus 100. As such, the tuple metrics information shows a reduction of Coupling Factors (COFs) of the apparatus 100.

The apparatus 100 uses an object oriented and ontology alignment design patterns approach to find and store alignments between the matched ontologies. In addition, the apparatus 100 provides easy expert verification and feedback mechanism for alignments evolution organization. Furthermore, the MBO strategy design pattern component 110 of the apparatus 100 is used for agility and reusability purpose.

Figure 2:
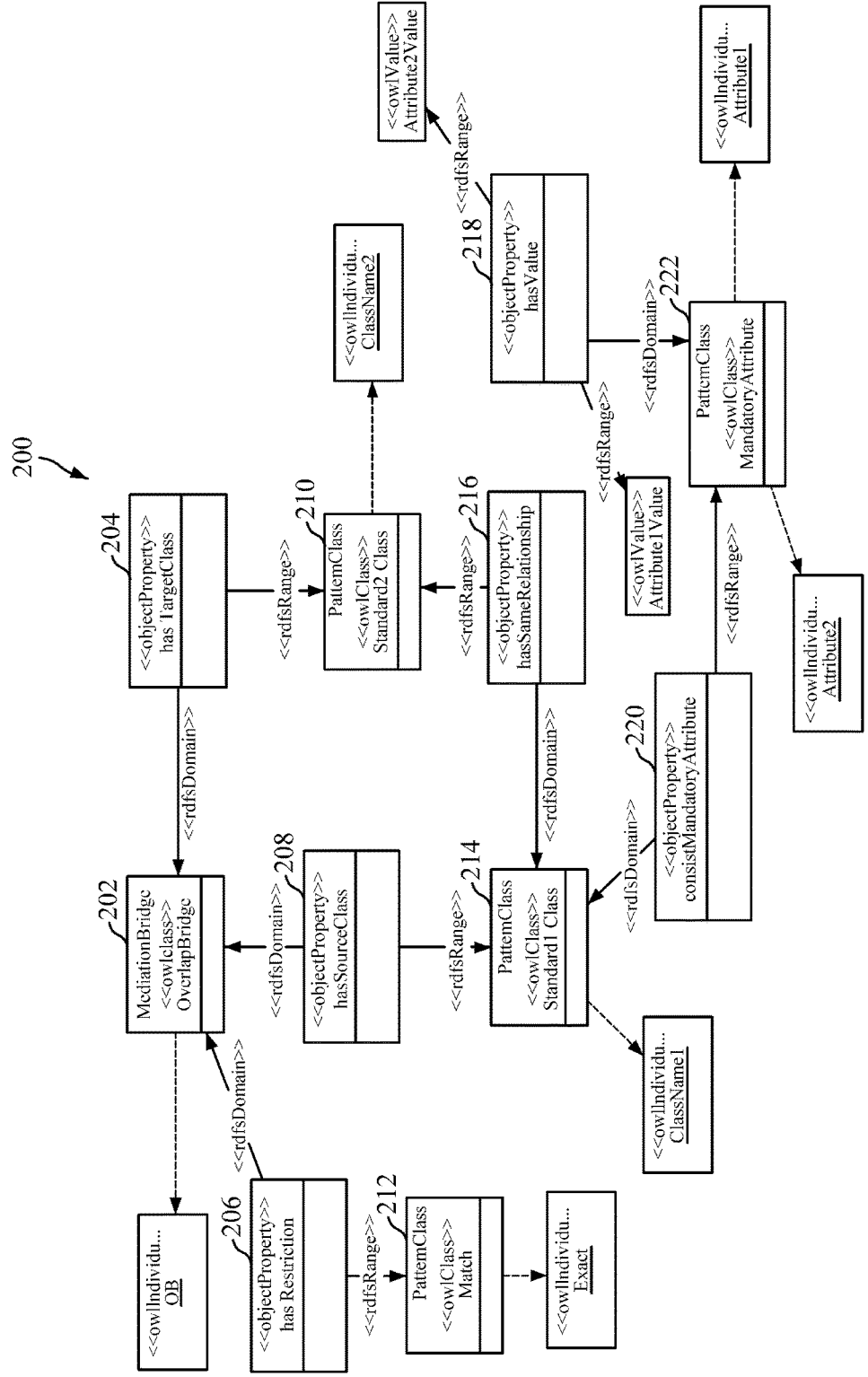
FIG. 2 is a diagram illustrating an OverlapPatternRelationshipModel (OverlapPRM) of an apparatus for processing MBO based on an ontology alignment pattern according to an exemplary embodiment of the present disclosure.

FIG. 2 is a diagram illustrating an OverlapPatternRelationshipModel (OverlapPRM) of an apparatus for processing Mediation Bridge Ontology (MBO) based on an ontology alignment pattern according to an exemplary embodiment of the present disclosure.

Referring to FIG. 2, an apparatus for processing Mediation Bridge Ontology (MBO) based on ontology alignment patterns according to an exemplary embodiment of the present disclosure includes an OverlapPatternRelationshipModel (OverlapPRM) component 200, and the OverlapPRM component 200 deals with the type of alignment patterns where source ontology concept with its mandatory attributes and values is mapped with target ontology concept. OverlapBridge 202 class has relationship with Standard1Class 214 and Standard2Class 210 through hasSourceClass 208 and hasTargetClass 204 object properties respectively. OverlapBridge 206 class is related with Match 212 class using hasRestriction 206 object property. There are cases in which mandatory properties of both the standards are exactly matched while in some cased source concept has subsumption relationship with target concept. Standard1Class 214 and Standard2Class 210 are also related with each other using hasSameRelationship 216 object property. Standard1Class (214) consists of MandatoryAttribute (222) connected by consistMandatoryAttributes (220) object property, and these MandatoryAttribute (222) contains some values represented by hasValue (218) data type property.

An apparatus for processing Mediation Bridge Ontology (MBO) based on ontology alignment patterns according to the present disclosure may add a new bridge algorithm and add/combine classes to be used, so that extendibility and reusability of the apparatus may increase.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for processing Mediation Bridge Ontology (MBO) based on ontology alignment patterns, the apparatus comprising:

an MBO strategy design pattern component configured to have strategy design pattern classes, to request, from a Pattern Relationship Model (PRM) component, a PRM for execution of the strategy design pattern classes, to receive the requested PRM from the PRM component, to execute a strategy design pattern using the received PRM, to acquire alignment information from the executed strategy design pattern, and to store the acquired alignment information; and an MBO mediation pattern component configured to provide one or more classes that can use services of other classes for reusability purposes between classes, and to add a new class to the MBO strategy design pattern component through an interface used for communicating with related objects for understanding interdependencies among the classes, wherein the PRM component is configured to have a plurality of PRMs, and, in response to a request from the MBO strategy design pattern component, to provide a PRM to the MBO strategy design pattern component, wherein the apparatus is evolved by adding a new ontology algorithm such that a PRM is added to the PRM component, wherein the MBO is categorized into two main classes including MediationBridge and PatternClass, and wherein the MediationBridge is divided into syntactic and structural bridge subclasses which represent alignments generated from particular algorithms in a specified format and are dependent on the PatternClass for structuring an output of an alignment process.

2. The apparatus of claim 1, wherein the MBO mediation pattern component is further configured to transfer messages among the strategy design pattern classes of the MBO strategy design pattern component.

3. The apparatus of claim 1, wherein the MBO strategy design pattern component comprises any one or any combination of any two or more of ChildPattern, PropertyPattern, String Pattern, Synonym Pattern, Pattern, OverlapPattern, and Label Pattern.

* * * * *